United States Patent [19]

Laquerre

[11] Patent Number: 4,926,625
[45] Date of Patent: May 22, 1990

[54] WINDROW TURNING APPARATUS

[75] Inventor: Yves Laquerre, Ste-Therese, Canada

[73] Assignee: B. & R. Choiniere Limited, Quebec, Canada

[21] Appl. No.: 235,098

[22] Filed: Aug. 23, 1988

Related U.S. Application Data

[63] Continuation-in-part of Ser. No. 30,140, Mar. 26, 1987, Pat. No. 4,777,788.

[51] Int. Cl.$^5$ .............. A01D 76/00; A01D 78/00; A01D 80/00; A01D 84/00
[52] U.S. Cl. .......................................... 56/376; 56/366
[58] Field of Search ......... 56/370, 376, 372, DIG. 21, 56/14.9, 15.6, 15.7, 15.8, 16.1, 16.3, 350, 351, 354

[56] References Cited

U.S. PATENT DOCUMENTS

| | | | |
|---|---|---|---|
| 2,529,577 | 11/1950 | Schempp et al. | 56/370 |
| 2,636,335 | 4/1953 | Whitney | 56/370 |
| 2,751,745 | 6/1956 | Magee | 56/364 |
| 2,761,270 | 9/1956 | Blaser et al. | 56/370 |
| 3,496,713 | 2/1970 | Reinhardt et al. | 56/370 |
| 3,834,142 | 9/1974 | Johnston et al. | 56/15.8 |
| 4,471,605 | 9/1984 | Ender, Sr. | 56/372 |
| 4,730,447 | 3/1988 | Fisher et al. | 56/376 |
| 4,736,577 | 4/1988 | Fisher | 56/370 |
| 4,777,788 | 10/1988 | Laquerre | 56/376 |
| 4,793,125 | 12/1988 | Ehrhart et al. | 56/16.1 |

*Primary Examiner*—Jerome W. Massie
*Assistant Examiner*—Gay Ann Spahn
*Attorney, Agent, or Firm*—Cushman, Darby & Cushman

[57] ABSTRACT

The present invention relates to an apparatus for inverting a windrow of hay or the like. The apparatus is in the form of an implement to be drawn by a tractor or any other appropriate vehicle and comprises a carriage supported at the front by skids and on which is mounted a pick-up conveyor assembly for gathering and elevating material from a windrow and depositing the elevated material on a rotating platform which moves the material 180 degrees along a circular path. The material is then discharged on the ground in inverted condition by the forward motion of the carriage.

12 Claims, 5 Drawing Sheets

WINDROW TURNING APPARATUS

This is a continuation-in-part of application Ser. No. 07/030,140, filed 3/26/87, now U.S. Pat. No. 4,777,788.

FIELD OF THE INVENTION

The present invention relates to agricultural equipment and more particularly to an apparatus for inverting a windrow of hay in a delicate manner to reduce the possibilities of a loss of the nutrient qualities of the hay.

BACKGROUND OF THE INVENTION

Hay, which is extensively used by farmers for fodder is prepared by mowing and raking grass or leafy plants in windrows which remain in the field for a few days to dry before being picked up and compacted for storage. To accelerate the curing of the hay, it is a common procedure to turn the windrow with a side rake once the upper side is dry, to expose to the sun the underside which is still damp.

In the past, various machines have been designed to automatically carry out this operation. As an example, the U.S. Pat. No. 2,391,427 of J. B. Kucera, discloses a windrow inverting apparatus in the form of a carriage to be drawn by a tractor and comprising a lower horizontal platform with inlet and outlet openings, and an upper horizontal rotatable device with downwardly extending prongs. In operation, material from the windrow enters on the lower platform through the inlet opening and it is advanced to the outlet opening by the prongs of the upper rotating device. From the outlet opening the material falls on the ground in inverted condition.

While these types of devices are satisfactory for certain types of grasses, when used to turn a windrow of leafy plants such as alfalfa, clover, trefoil or the like a loss of the nutrient qualities of the hay has been noted.

Most of the nutrition of the hay made of leafy plants is contained in the small leaves thereof which dry faster than the stems do and become brittle. The windrow turning apparatuses of the type described above manipulate the hay vigorously by advancing the hay by means of prongs engaging the upper side thereof which is dry. As a result, many leaves are detached from the stems, severely degrading the nutrient qualities of the hay.

OBJECTS AND STATEMENT OF THE INVENTION

An object of the present invention is an apparatus to invert a windrow of hay without undue agitation to reduce the possibility of a loss of the nutrient qualities of the hay.

Another object of the invention is a windrow inverting apparatus which is of a relatively simple and inexpensive construction.

The objects of this invention are achieved by providing a windrow turning apparatus comprising a carriage which preferably is to be drawn by a tractor or any other suitable vehicle and comprising broadly, a pick-up conveyor assembly to gather hay from a windrow, and a rotatable platform receiving the hay from the pick-up conveyor assembly. The rotatable platform moves the hay preferably 180 degrees along a circular path and then discharges the hay on the ground in an inverted condition by the forward movement of the machine. Since the hay is supported on the pick-up conveyor and on the rotatable platform on the underside, there is little or no agitation of the upperside which is dry, thus preventing nutritious leaves to break off and become lost.

In a preferred embodiment, the pick-up conveyor assembly comprises an inclined conveyor extending upwardly and rearwardly and which is constituted by an endless belt of rubber-like material defining a continuous supporting surface. On the endless belt are mounted a plurality of upstanding pick-up fingers of a type well known in the art. The pick-up conveyor assembly further includes a secondary conveyor lying generally in a horizontal plane and being positioned rearwardly with respect to the inclined conveyor.

When the carriage is advanced in a field over a windrow of hay, hay is gathered by the inclined conveyor and is elevated and deposited on the secondary horizontal conveyor which delivers the material on the rotatable platform. Guide members or deflectors are positioned adjacent the periphery of the platform and centrally thereof to guide the windrowed material in an arcuate path toward a discharge mouth portion where it is delivered on the ground in inverted position by the forward motion of the machine so as to form a windrow parallel to the unturned windrow but laterally offset therefrom, on dry ground.

Preferably strips of material providing a high degree of friction are mounted on the upperside of the rotatable platform to reduce slippage of the hay thereon.

The rotatable platform and the pick-up conveyor assembly are driven by means of power transmitting elements such as chains, belts, gears or the like which are connected to the wheels of the carriage. This arrangement has two distinct advantages. Firstly, it allows the pick-up conveyor assembly and the rotatable platform at a speed proportional to the speed of the carriage with respect to the ground. Secondly, the construction of the windrow turning apparatus is greatly simplified over other possible arrangements employing a mechanical drive line and a gear box or hydraulic motors to drive the various elements of the apparatus.

In a variant, the windrow turning apparatus is provided with a skid assembly supporting the front section of the apparatus on the ground, the skid assembly slidingly engaging the ground surface when the apparatus moves forward. The windrow turning apparatus is connected to a pulling vehicle through a pulling bar assembly pivotally mounted to the frame of the apparatus, the pivotal movement being assisted by a spring connected between the pulling bar assembly and the frame of the vehicle to obtain a smooth and controlled movement of the pulling bar assembly when the vehicle advances on an uneven terrain.

Therefore, the present invention comprises in a general aspect an apparatus for inverting a windrow of material such as hay or the like in a delicate manner, the apparatus comprising:

a carriage adapted to be advanced parallel to a windrow of the material lying upon the surface of the ground, the carriage comprising skid means mounted to the front portion of the carriage and slidingly engaging the ground surface;

windrow pick-up means mounted on the carriage, the windrow pick-up means extending from a point adjacent to the ground to an elevated position for elevating progressively the windrow from the ground;

a windrow turner including a rotatable platform which is mounted to the carriage adjacent the windrow pick-up means for receiving windrowed material from the windrow pick-up means and advancing the material along an approximately circular path, the rotatable platform having a roughened upper surface constituting mechanical anti-slipping means for reducing slippage of the material thereon;

discharge mouth portion mounted on the carriage adjacent the rotatable platform through which the windrow is deposited on the ground in inverted condition by the forward motion of the apparatus, the windrowed material being supported on the windrow pick-up means and on the rotatable platform on the underside to reduce agitation of the upper side thereof.

BRIEF DESCRIPTION OF THE DRAWINGS

Throughout the drawings, similar parts are identified by the same reference numerals.

DESCRIPTION OF A PREFERRED EMBODIMENT

Figure 1:
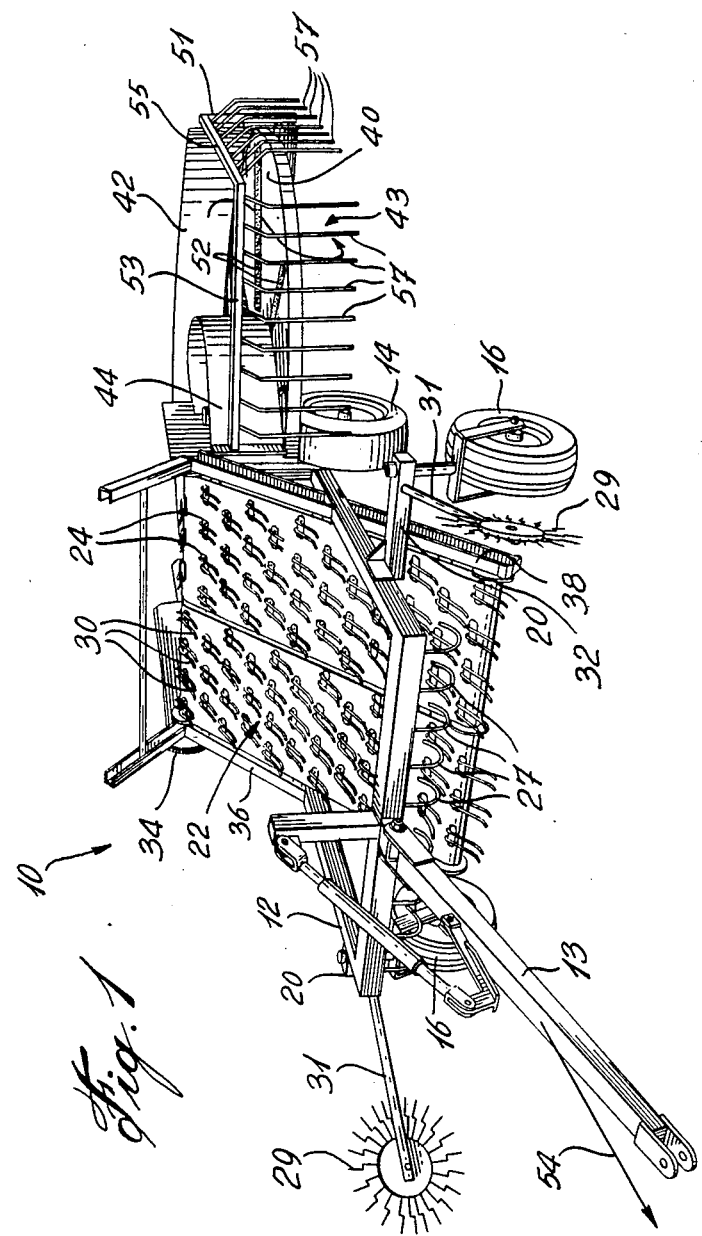
FIG. 1 is a perspective view of a windrow turning apparatus according to the present invention.
Figure 2:
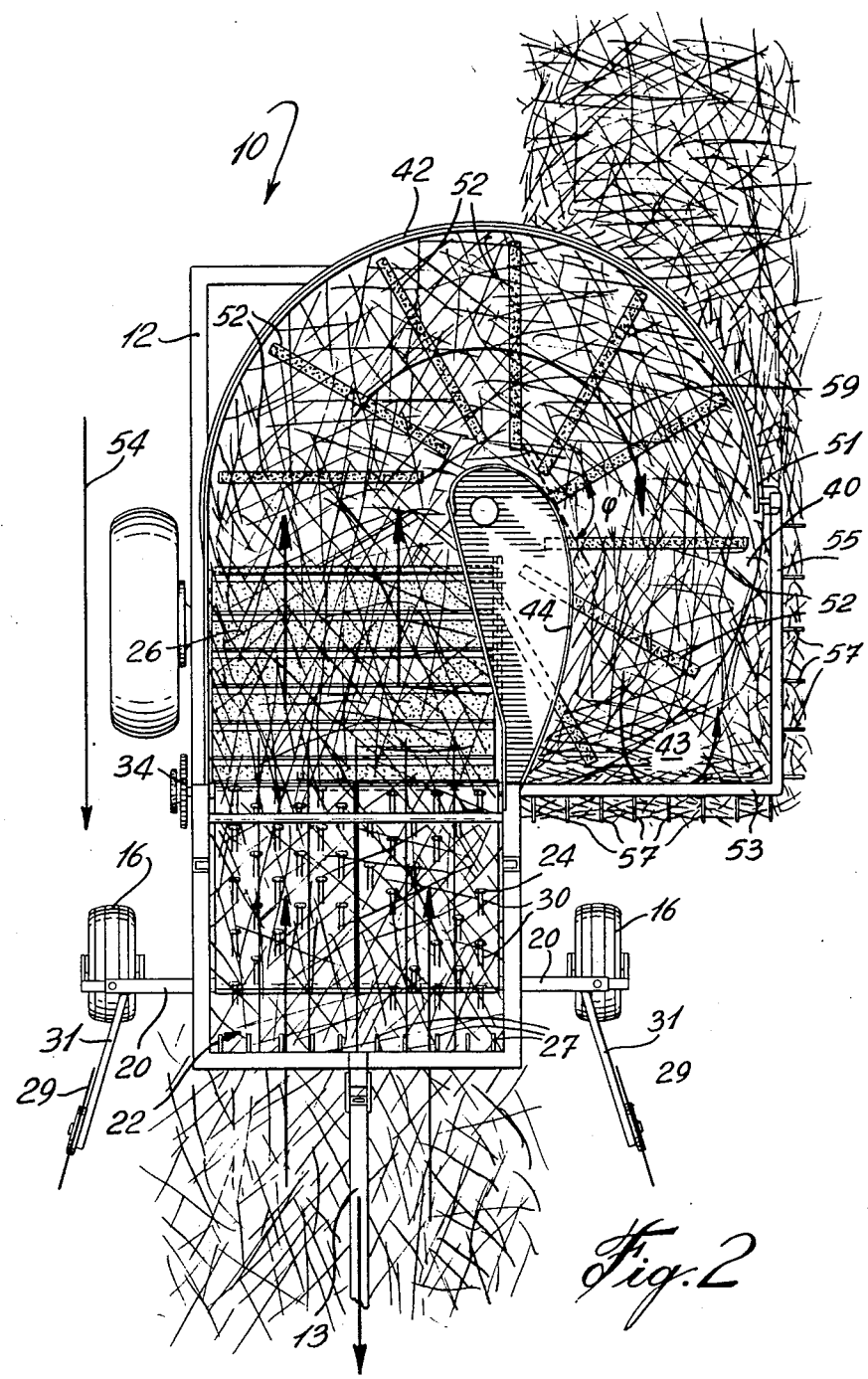
FIG. 2 is a top plan view of the apparatus illustrated in FIG. 1, some elements being omitted.

Referring now to FIGS. 1 and 2 of the annexed drawings, the windrow turning apparatus illustrated therein and identified generally by the reference numeral 10 is in the form of a carriage adapted to be drawn by a tractor or any other appropriate vehicle. The carriage comprises a main rectangular frame 12 made of hollow metallic beam members welded to each other at their ends. The frame 12 is supported on rear wheels 14 and on front caster wheels 16 allowing the carriage to be steered in any desired direction.

The caster wheels 16 are mounted to the frame 12 by means of short lateral extensions 20, in the form of hollow metallic members which are welded or otherwise attached to the frame 12.

The frame 12 is also provided with a conventional pulling bar 13 for connecting the windrow turning apparatus 10 to a pulling vehicle.

The apparatus 10 further includes a pick-up conveyor assembly 22 comprising a first conveyor 24, which is inclined upwardly and rearwardly, and a second generally horizontal conveyor 26, which is best illustrated in FIG. 2. More particularly, the inclined conveyor 24 comprises a pair of endless belts made of rubber-like material defining a continuous supporting surface, and on which are mounted a plurality of upstanding pick-up fingers 30 of a type well known in the art. The endless belts of the inclined conveyor 24 are mounted for rotation about a pair of spaced apart rollers 32 and 34 rotatably mounted at respective ends of two channel members 36 and 38, secured to the frame 12.

The horizontal conveyor 26 is of a similar construction except that it is shorter than the conveyor 24 and the pick-up fingers 30 have been omitted.

To the frame 12, adjacent the roller 32 are mounted a plurality of curved and rearwardly extending metallic bars 27. The purpose of the metallic bars 27, as it will appear hereinafter is to slightly press and guide the windrow toward the conveyor 24 as the apparatus 10 advances, thus avoiding a buildup of hay which may form in front of the apparatus if the bars 27 were omitted.

The apparatus 10 further comprises a pair of rake wheels 29 mounted to the frame 12 by means of forwardly and laterally extending arms 31. Each rake wheel which is of a type generally well known in the art is constituted by a plurality of radially extending tines defining a circular structure which can freely rotate at the end of the respective arm 31 when the apparatus 10 advances. The purpose of the rake wheels 29 is to guide the windrow toward the conveyor 24 during the operation of the apparatus 10.

The apparatus 10 further includes a rotatable platform 40 which is circular and is made of sheet-metal or any other appropriate material. The platform 40 is mounted to the frame 12 by means of suitable bearings for rotation about a generally vertical axis.

A pair of guide members or deflectors are mounted adjacent the rotatable platform 40 for guiding the movement of windrowed material thereon. More specifically, an outer guide member 42 having an arcuate shape is mounted adjacent the periphery of the platform 40, extending along a substantial portion of the circumference thereof. An inner guide member 44, comprises an inner arcuate part 46 adjacent the axis of rotation of the rotatable platform 40, and an outer elongated curved part 48 connected to the inner part 46 and extending toward the periphery of the rotatable platform 40. The shape of the outer curved part 48 is relatively important for the success of the invention. More particularly, referring to FIG. 3, the outer curved part 48 is of such a shape that the angle formed between an imaginary line tangent to the outer curved part at a certain point thereof, and an imaginary line extending along a radial direction with respect to the rotatable platform 40 and passing through the said certain point, remains constant when measured at various positions along the outer curved portion 48. As it appears in FIG. 3, the imaginary lines T which are tangent to the outer curved part 48 define the same angle α with imaginary lines R extending radially on the rotatable platform 40, at various positions on the outer curved part 48. This constant angle relation holds true for the major portion of the length of the curved part 48.

The outer and the inner guide members 42 and 44 are made of sheet-metal and are secured to the frame 12 by means of suitable brackets.

Between the outer portion of the guide member 44 and an extremity 51 of the guide member 42 is defined a discharge mouth portion 43 through which hay from the rotatable platform 40 is discharged on the ground as it will be explained in detail hereinafter.

A grating 53 is mounted in front of the mouth portion 43 to guide the windrowed material toward the ground and prevent it to be ejected too far away from the mouth portion 43 when the apparatus 10 operates at a relatively high speed. The grating 53 comprises an L-shaped metallic bar 55 secured to the frame 12 and a plurality of downwardly extending tines 57.

On the rotatable platform 40 are adhesively mounted a plurality of friction strips 52 having an upper face providing a high degree of friction. The friction strips 52 may be constituted by strips of paper or the like having an adhesive backing on one side and on the other side being provided with a layer of sand-like granular material. Each friction strip is generally straight and it is inclined with respect to a radial direction of the rotatable platform 40 so as to define an angle φ of approximately 45°.

The inclined conveyor 24, the horizontal conveyor 26 and the rotatable platform 40 are driven by means of various power transmitting elements such as chains, sprockets and gears connected to the rear wheels 14 of the vehicle. Therefore, when the apparatus 10 is driven by a tractor or the like, the pick-up conveyor assembly and the rotatable platform 40 are automatically rotated. It is desirable that the linear speed of the conveyor 24 be slightly higher than the speed of the apparatus 10 with respect to the ground which may be easily achieved by selecting the proper ratios between the various gears or the other power transmitting components.

The particular set-up used to drive the rotatable platform 40 and the conveyors 24 and 26 will not be described in detail since it is not essential to the invention and the design of such set-up is well within the reach of a man skilled in the art.

The operation of the apparatus 10 is as follows.

The apparatus 10 is connected to a tractor or any other similar vehicle to be drawn in a field over a windrow of hay or the like, in the direction indicated by the arrow 54 in FIGS. 1 and 2. This driving direction 54 is also referred to as forward motion. The rake wheels 29 and the curved bars 27 guide the windrow toward the conveyor 24 which gathers material from the windrow and elevates the material at a point where it is deposited on the horizontal conveyor 26 which, in turn, deposits the material on the rotatable platform 40.

The latter advances the material along a circular path in the direction shown by the arrow 59 between the guide members 42 and 44, up to the discharge mouth portion 43 where the material falls on the ground and is inverted by the forward movement of the apparatus 10 to form a windrow parallel to the windrow of unturned material but which is laterally offset on a dry surface.

During the whole operation, the windrowed material to be inverted is manipulated mainly from the underside which is still damp and less brittle than the upperside which is dry, thus preventing, at least to a certain extent the loss of nutrient qualities of the hay which occurs when conventional windrow turning apparatuses are used.

The shape of the outer curved part 48 allows obtaining a constant angle relationship with the friction strips 52 permitting movement of the windrowed material with the platform 40 along a circular path and depositing the material on the ground smoothly, without creating a buildup of hay at the mouth portion 43.

Figure 3:
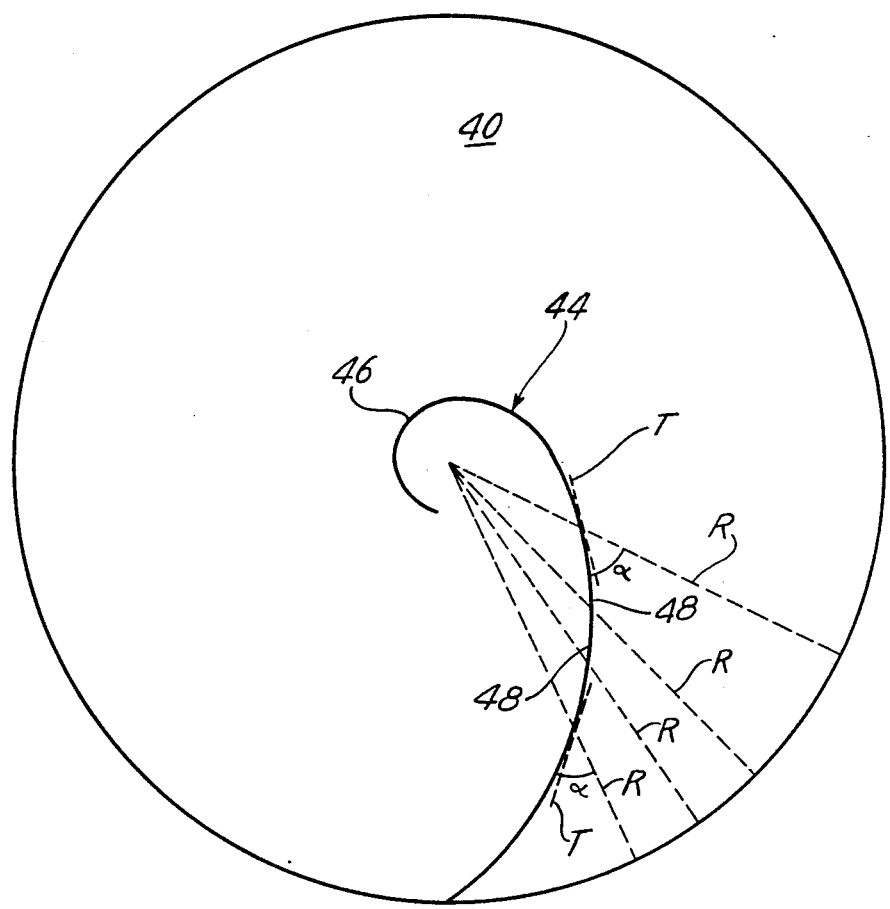
FIG. 3 is a schematical view illustrating the shape of a guide member of the apparatus according to the invention.
Figure 4:
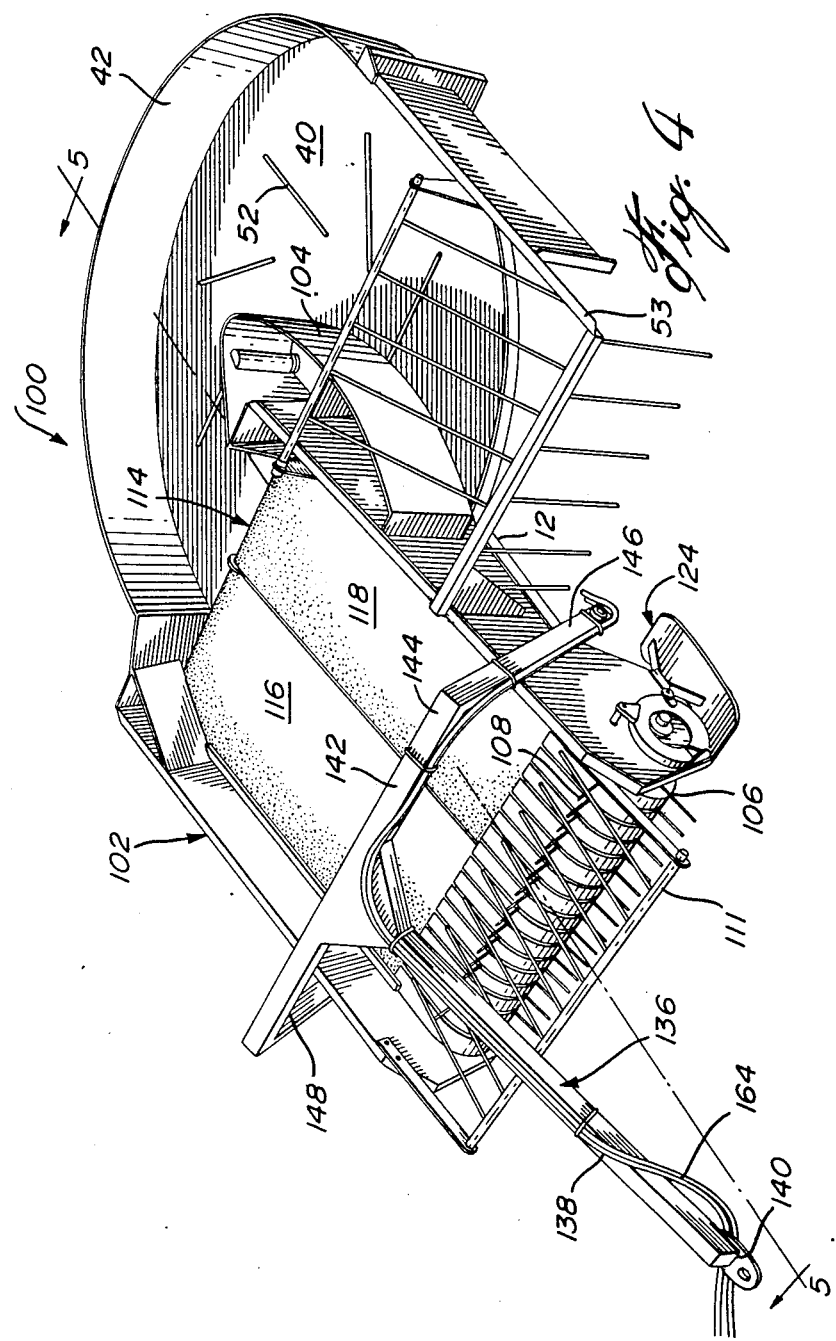
FIG. 4 is a perspective view of a variant of a windrow turning apparatus according to the present invention.
Figure 5:
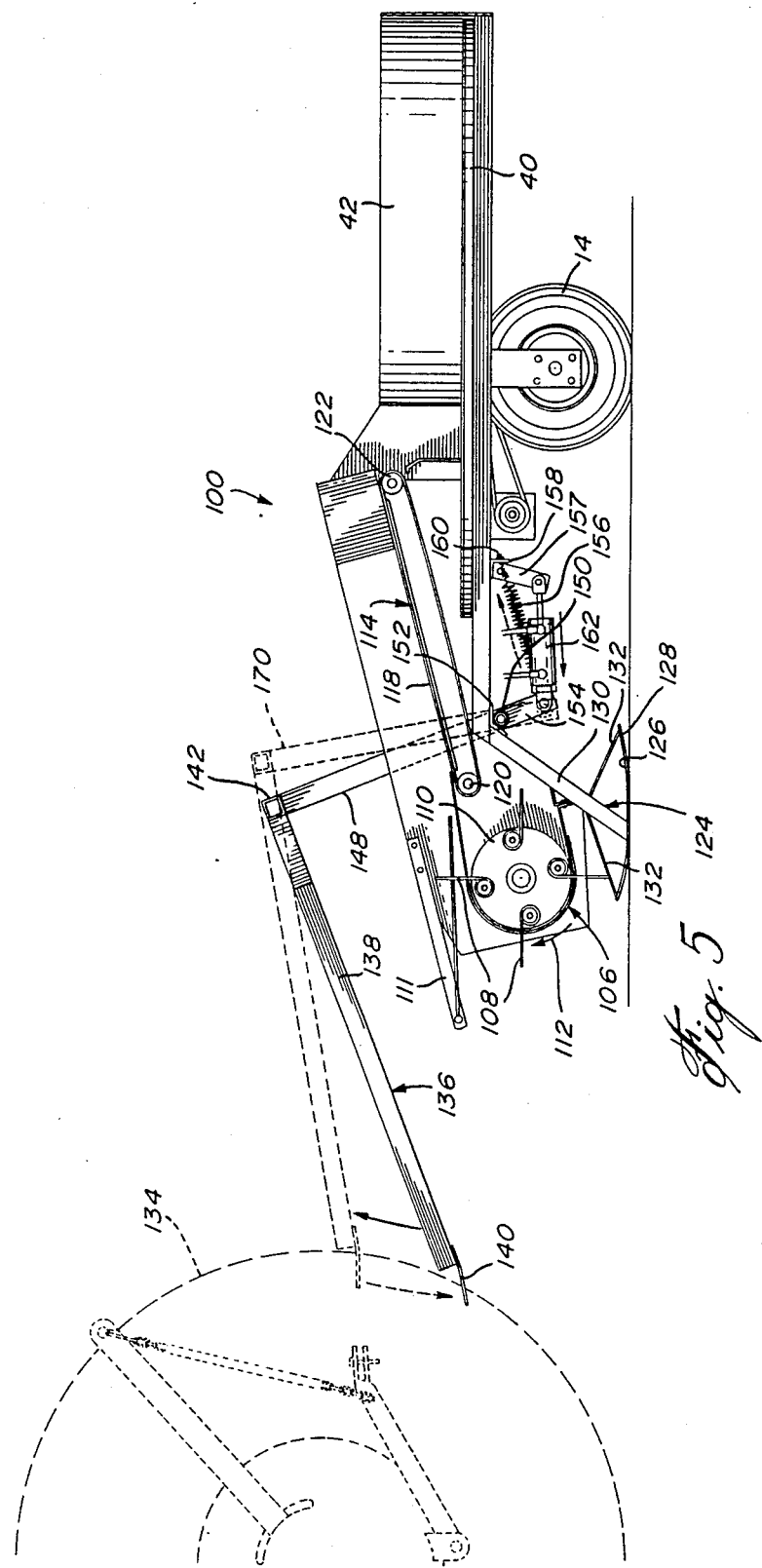
FIG. 5 is a sectional view taken along lines 5—5 of FIG. 4.

A variant of the windrow turning apparatus is shown in FIGS. 4 and 5. The apparatus identified by the reference numeral 100 differs with respect to the embodiment illustrated in FIGS. 1-3 in two significant respects, namely in the structure of the pick-up conveyor assembly 102 and in the structure of the pulling bar assembly 136 for connecting the apparatus 100 to a pulling vehicle.

The pick-up conveyor assembly 102 comprises a hay gathering device 106, of a type known in the art, extending in front of the apparatus 100 and including a plurality of radially extending fingers 108 mounted to a rotor 110 journaled to the frame 12 for rotation about a horizontal axis which is generally transverse to the direction of forward movement of the apparatus 100. The wheels 14 of the apparatus 100 are connected in driving relationship to the rotor 110 through a chain and sprocket type transmission to drive the rotor 110 in the direction shown by the arrow 112. The chain and sprocket type transmission will not be described in detail because it is not critical to the invention since other types of transmissions may also be used.

Above the hay gathering device 106 is mounted a grating 111 to slightly press the hay toward the rotor 110 when the apparatus 100 advances.

Downstream of the hay gathering device 106 is mounted a conveyor belt assembly 114 comprising a pair of endless and smooth rubber belts 116 and 118 mounted side by side on spaced apart rotors 120 and 122 journaled to the frame 12 of the apparatus 100 for rotation about a horizontal axis. The rotor 120 is an idler rotor, the rotor 122 being a driving rotor connected to the wheels 14 of the apparatus 100 through a chain and sprocket type transmission (not shown in the drawings).

The front section of the apparatus 100 is supported on the ground by a skid assembly 124 slidingly engaging the ground surface during the forward movement of the apparatus 100. The skid assembly 124 includes a pair of skids 126 (only one being shown in the drawings) mounted adjacent the extremities of the rotor 110, each skid 126 including a ground engaging metallic plate 128 with slightly raised end portions and being connected to the frame 12 by a slanted metallic bar 130.

To rigidify the plate 128 a pair of stiffening brackets 132 are provided, connecting the ends of the plate 128 to the bar 130.

For use, the apparatus 100 is normally connected to a pulling vehicle 134, such as a tractor shown in dotted lines in FIG. 5, by a pulling bar assembly 136 comprising a straight bar 138 having a free front end provided with a pivotal coupling 140 for connection to the tractor 134. The coupling 140 is of a type allowing the bar 138 to pivot about a vertical axis and a horizontal axis with respect to the tractor 134. The rear end of the bar 138 is connected to a rectangular frame 142 comprising a top beam 144, two downwardly extending vertical beams 146 and 148 connected to a lower and generally horizontal beam 150 having a circular cross-section. The horizontal beam 150 is pivotally mounted in brackets 152 (only one being shown) bolted to the frame 12 to enable the beam 150 to pivot about a horizontal axis which extends transversely relatively to the direction of movement of the apparatus 100.

A downwardly extending lever 154 is welded or otherwise attached to the horizontal beam 150, the lower end of the lever 154 being connected to an end of a coil spring 156, the other end of the spring 156 being attached to the frame 12 by an angle bracket 158. To allow for adjustment of the spring tension, the spring 156 is connected to the bracket 158 by a nut 160 threadedly engaged to the spring 156.

The lever 154 is also connected to the frame 12 of the vehicle by a fluid ram 162. The fluid ram 162 may be hydraulic or pneumatic, operating fluid being channeled to and from the ram 162 through lines 164 connected to the pressurized fluid supply of the pulling vehicle 134. The cylinder of the fluid ram 162 is pivotally connected to the lever 154, the piston of the fluid ram is pivotally connected to one end of a link 157, the opposite end of the link 157 being pivotally mounted to the frame of the apparatus 100.

The remaining elements of the apparatus 100 are generally similar to those of the embodiment shown in FIGS. 1-3.

In use, the apparatus 100 is attached to the pulling vehicle 134 through the pulling bar assembly 136, by raising the bar 138 and connecting the coupling 140. The pulling bar assembly then assumes the position shown in dotted lines in FIG. 5 and identified by the reference numeral 170. The upward movement of the bar 138 causes the horizontal bar 150 to pivot, thus tensioning the spring 156 to reduce the pressure exerted by the skid assembly 124 on the ground. This pressure may be controlled as desired by adjusting the spring pressure simply by rotating the nut 160 in the appropriate direction.

It should be appreciated that the pulling bar assembly 136 acts as a suspension for the apparatus 100 preventing a sudden drop of the front end when the skid assembly 124 encounters a hole or a depression in the ground.

The fluid ram 162 is used to elevate the front end of the apparatus 100 from the ground. By pumping pressurized fluid to retract the piston of the fluid ram 162, while the pulling bar assembly 136 is connected to the vehicle 134, the link 157 will be pulled until it is substantially aligned with the fluid ram 162, then the pulling bar assembly will be pivoted raising the skid assembly 124.

When the apparatus 100 advances, the wheels 14 rotate the hay gathering device 106 and the conveyor 114 to elevate the windrow from the ground and deposit the windrow on the rotatable platform 40. The platform 40 which is also driven by the wheels 14 advances the windrowed material along a circular path and deposits the material on the ground in inverted condition.

Although the invention has been described above with respect to one specific form, it will be evident to persons skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. An apparatus for inverting a windrow of material such as hay or the like in a delicate manner, comprising:
   a carriage including (a) means for enabling a forward motion thereof parallel to the windrow of said material lying upon the surface of the ground, (b) a front portion, and (c) skid means mounted on said front portion and slidingly engaging the surface of the ground;
   windrow pick-up means mounted on said carriage, said windrow pick-up means extending from a point adjacent to the ground to an elevated position for picking up the windrow and for elevating progressively said windrow from the ground;
   a windrow turner including a rotatable platform mounted onto said carriage adjacent said windrow pick-up means for receiving windrowed material from said windrow pick-up means and for moving the received windrowed material along an approximately circular path, said rotatable platform having a roughened upper surface constituting mechanical anti-slipping means for reducing slippage of said material thereon; and
   a discharge mouth portion on said carriage adjacent said rotatable platform through which material is deposited on the ground in inverted condition from said rotatable platform by the forward motion of said carriage, the material being supported on said windrow pickup means and on said rotatable platform on the underside to reduce agitation of the upper side thereof.

2. An apparatus as defined in claim 1, wherein said rotatable platform is substantially circular.

3. An apparatus as defined in claim 2, further comprising guide means mounted on said carriage for guiding the material during the movement thereof along said circular path.

4. An apparatus as defined in claim 3, wherein said guide means includes an outer guide member extending peripherally along said rotatable platform.

5. An apparatus as defined in claim 1, wherein said anti-slipping means comprises a plurality of strips having an upper surface providing a high degree of friction.

6. An apparatus as defined in claim 1, wherein said forward motion enabling means comprises means for allowing a vehicle such as a tractor to draw the said carriage.

7. An apparatus as defined in claim 1, wherein said forward motion enabling means comprises wheel means engaging the surface of the ground, said windrow pick-up means and said rotatable platform being driven by said wheel means through transmission means.

8. An apparatus as defined in claim 1, wherein said windrow pick-up means comprises:
   (a) a rotor mounted in front of said apparatus and extending generally transversely to the direction of said forward motion of the carriage, said rotor comprising a plurality of radially extending fingers;
   (b) a conveyor mounted between said rotor and said rotatable platform; and
   (c) drive means in operative relation with said rotor and with said conveyor to drive said rotor and said conveyor during the forward motion of said carriage.

9. An apparatus as defined in claim 8, wherein said conveyor comprises at least one smooth, upwardly and rearwardly extending endless belt mounted on two spaced apart rotors each extending along a generally horizontal axis.

10. An apparatus as defined in claim 1, wherein said forward motion enabling means comprises (a) a pulling bar assembly for connecting said carriage to a pulling vehicle, said pulling bar assembly being pivotally mounted to a frame of said carriage, and (b) spring means mounted to said frame and to said pulling bar assembly to undergo deformation upon pivotal movement of said pulling bar assembly.

11. An apparatus as defined in claim 10, wherein said pulling bar assembly comprises a generally horizontal bar pivotally mounted to said frame, said horizontal bar comprising a lever, a fluid ram being connected to said lever and to said frame to pivot said pulling bar assembly.

12. An apparatus as defined in claim 11, wherein said spring means is a coil spring having one end connected to said lever and an opposite end connected to said frame.

* * * * *